Sept. 29, 1925.  F. A. BALLOU, JR  1,555,095
SAFETY CATCH FOR PIN STEMS
Filed April 26, 1924
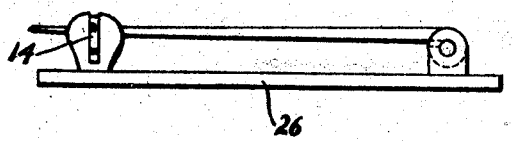
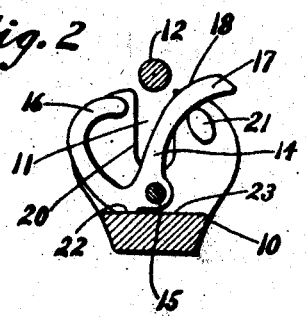
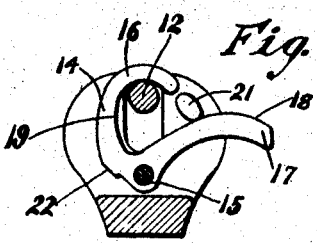
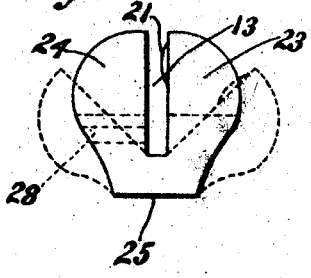
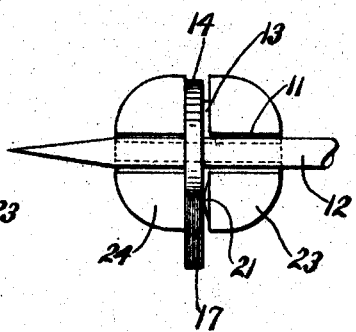
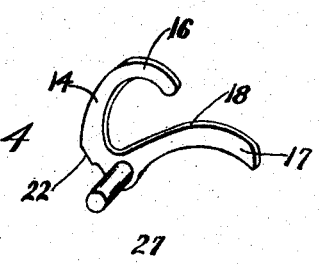
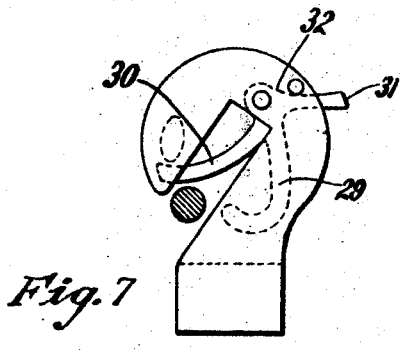
Inventor
Frederick A. Ballou Jr.
By Barlow & Barlow
Attorneys Patented Sept. 29, 1925.

1,555,095

UNITED STATES PATENT OFFICE.

FREDERICK A. BALLOU, JR., OF PROVIDENCE, RHODE ISLAND, ASSIGNOR TO B. A. BALLOU & CO., INC., OF PROVIDENCE, RHODE ISLAND, A CORPORATION OF RHODE ISLAND.

SAFETY CATCH FOR PIN STEMS.

Application filed April 26, 1924. Serial No. 709,312.

*To all whom it may concern:*

Be it known that I, FREDERICK A. BALLOU, Jr., a citizen of the United States, residing at Providence, in the county of Providence and State of Rhode Island, have invented certain new and useful Improvements in Safety Catches for Pin Stems, of which the following is a specification.

This invention relates to an improved construction of safety catch for pin stems; and has for its object to provide such a catch which is constructed to be automatically closed and locked by the positioning of the pin stem in the catch.

With these and other objects in view, the invention consists of certain novel features of construction, as will be more fully described, and particularly pointed out in the appended claims.

In the accompanying drawings:

Figure 1 is a side elevation illustrating a bar pin with a pin stem mounted therein and having its pointed end secured in my improved construction of safety catch.

Figure 2 is an enlarged sectional side elevation illustrating the guard member as moved to released position and the cam-shaped operating arm in position to be actuated by the entering pin stem.

Figure 3 is the same as Figure 2 but showing the hook arm of the guard as moved to closed position locking the pin in the slot.

Figure 4 is a detailed perspective view of the guard member with its hook and operating arms.

Figure 5 is a side elevation of the body of the catch with the guard member removed and showing the side arms of the catch as dotted in partly closed position.

Figure 6 is a top view of the catch and showing a portion of the pin stem in position therein and secured by the guard.

Figure 7 is a modification illustrating my improved construction of guard member as applied to a hook-form of catch.

It is found in the practical construction of safety catches for pin stems, of advantage to pivotally mount a guard member in the body of the catch and to provide the catch with an operating arm having a cam-shaped working edge which when the guard is in open position, sets diagonally across the pin stem whereby the entering movement of the pin stem acts on the cam-shaped edge to wedge between the side wall of the slot and the working edge of the cam to force the operating arm over its locking protuberance and move the hook arm over to close the slot and lock the pin stem therein. Further, it is found of advantage in a safety catch of this character to lock the pivot pin of the guard adjacent the bottom portion of the slot and in alignment therewith, whereby the opening strain of the pin stem will be in a radial line to the center line of the guard pivot whereby its action upon the hook arm cannot move this arm to unlocked position. Then again by positioning the pivoting pin in alignment with the slot, the straight side walls of the slot restrict the lateral motion of the pin stem in the slot and so prevent any action on the hook arm of the guard to inadvertently move it to unlocked position.

It is also found of advantage to form the operating arm of this catch in cam-shape whereby it may be readily moved to locked position by the entering pin stem and upon being moved from locked to unlocked position the cam edge of this arm acts to expel the pin stem from the slot; and the following is a detailed description of one construction by which these advantageous results may be accomplished:—

With reference to the drawings, 10 designates the body of the catch member which is slotted longitudinally at 11 to receive the pointed end of the pin stem 12. Also, this body member is slotted transversely as at 13 for the reception of the guard member 14 which is pivoted therein at 15.

This guard member when applied to a catch having a pin stem-receiving slot formed in its top or outer edge, is provided with a hook-shaped arm 16 and an operating arm 17, which latter arm is provided with a cam-shaped working edge 18 adapted to set diagonally across the slot 11 when the hook arm is moved to open position. The pivot 15 of this guard member is preferably set adjacent the bottom of the slot in alignment with the center line through the slot 11, whereby when the hook arm is in closed position the outward strain on the pin stem, is in a radial line to the center of the pivot 15 and the width of the slot 11 is substantially the diameter of the pin stem. These walls restrict the lateral movement of the pin stem when in the slot and so prevent it from engaging the inner edge 19 of the hook arm which is rounded outwardly beyond the edge of the slot, and so positively prevents any lateral movement of this pin, from moving this hook arm out of its locked position. Then again, by so constructing this arm 17 with its cam-shaped working edge to lie diagonally across the slot 11, upon pressing the pin stem 12 into this slot it acts as a wedge between the edge 20 of the slot and the cam edge 18 of the arm 17 to wedge, pry or force this arm over the protuberance 21 which serves as a detent for holding this guard member when in either open or closed position. This protuberance is formed on the inner face of the slot 13 to project slightly into the space in the slot and so create sufficient friction on the arm 17 in passing inwardly and outwardly and hold it in either position after it has passed the same.

In some instances, I provide a flattened stop portion 22 on the heel of the guard member to rest against the bottom 23 of the slot to limit the opening movement of this guard member.

In practice the body of this catch is swaged into the desired shape and the side ears 23 and 24 thereof are subsequently bent up into position, as illustrated in Figure 5, forming the slot 13 and providing a face 25 to be attached to the body 26 of the pin, by solder or other suitable means.

In some instances, instead of passing the pivot pin 15 through the guard, I form a laterally-extending pivot pin 27 integral with and on the side of the guard and pass the same into a hole 28 in the member 24 of the catch before the members 23 and 24 are folded up into the position illustrated in Figure 5.

In some instances instead of forming the catch with a slot open at its top or outer edge, I form a hook-shaped slot as illustrated in Figure 7, wherein the slot opens in a direction towards the base portion, and the guard member in this case, may be provided with a hook-shaped arm 29, a cam-shaped arm 30, a hand-operated arm 31, and the same may be pivoted adjacent the bottom of the slot as at 32.

My improved catch is more particularly applied to the more expensive jewelry to obtain the maximum security in locking the pin stem in closed position wherein the positioning of the pin stem automatically locks the catch and when locked cannot become inadvertently unlocked by any movement or excessive strain which may be applied to the pin stem.

The device is very simple and practical in construction and effective in its operation.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A safety catch for pin stems, comprising a body portion slotted to receive the pin stem, a guard pivoted to said body in line with said slot having a hook-shaped retaining arm, and an operating arm with a cam-shaped working edge, said edge being set at an angle to said hook arm to be positioned diagonally across said slot when the hook arm is moved to unlocked position, whereby an entering movement of the pin stem moves the cam arm to close the hook arm.

2. A safety catch for pin stems, comprising a body portion having a slot to receive the pin stem, a pivoted guard on said body with a cam face positioned diagonally across said slot when moved to unlocked position and responsive to the slot entering movement of said stem to be moved to locked position, said cam face acting to eject said pin stem when the guard is moved to unlocked position, and means independent of the pin stem for retaining said guard in either locked or unlocked position.

3. A safety catch for pin stems, comprising a body portion having a slot to receive the pin stem, a guard, a pivot pin in substantial alignment with said slot for movably mounting said guard in said body, said guard having an arm positioned diagonally across said slot when the guard is moved to unlocked position whereby said guard is responsive to the slot entering movement of said pin stem to be moved to locked position and the opening movement of said stem will be in a line substantially radial to the center of said pivot.

4. A safety catch for pin stems, comprising a body member slotted to receive a pin stem, a guard pivoted in said body, the pivot pin thereof being disposed in substantial alignment with the central line of said slot, said guard having a hook-shaped retaining arm, and an operating arm having a cam-shaped working edge set at an angle to said hook arm to be positioned diagonally across said slot when the hook is moved to unlocked position, whereby an entering movement of the pin stem wedges between the slot wall and cam edge to move the cam arm to close the hook, and said cam edge serves to eject the pin stem upon being moved towards open position.

In testimony whereof I affix my signature.

FREDERICK A. BALLOU, Jr.